April 13, 1943.    A. F. FLOURNOY    2,316,511
FISH STRINGER
Filed Nov. 19, 1941

Inventor
A. F. Flournoy

Patented Apr. 13, 1943

2,316,511

UNITED STATES PATENT OFFICE 2,316,511

FISH STRINGER

Algernon F. Flournoy, Monroe, La.

Application November 19, 1941, Serial No. 419,741

2 Claims. (Cl. 224—7)

My invention relates to fish stringers and more especially to the construction of the stop bar part of fish stringers.

An object of my invention is to provide a fish stringer with a stop bar which is adapted to be aligned with the cord of the fish stringer so that it may be drawn through the strung fish in the process of unstringing them.

Another object of my invention is to provide a fish stringer with a stop bar which is adapted to fit over the needle portion of another stringer to permit the fish strung on one stringer to be slid onto the other stringer.

Other objects and advantages of my invention will appear in the course of my detailed description of the figures of my drawing which illustrates the preferred embodiment of my invention.

Referring to the drawing.

Figure 1:
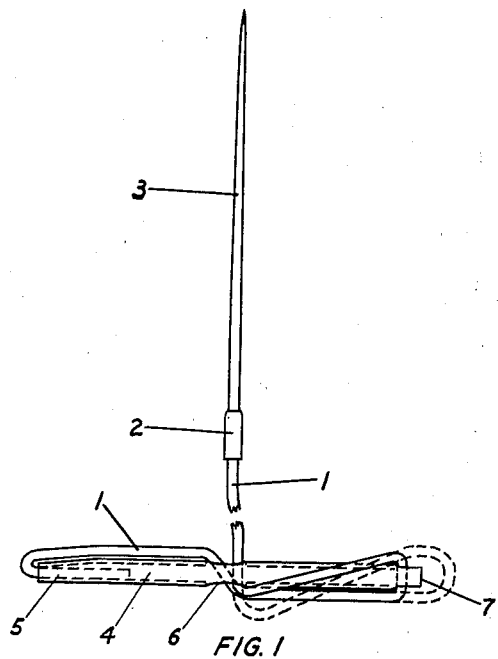
Figure 1 is a plan view of a fish stringer embodying my invention showing the stop bar in its set position.
Figure 3:
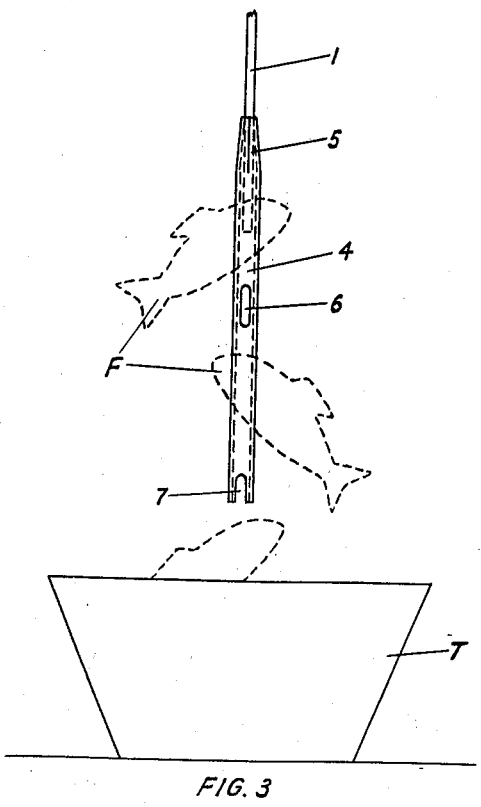
Figure 4:
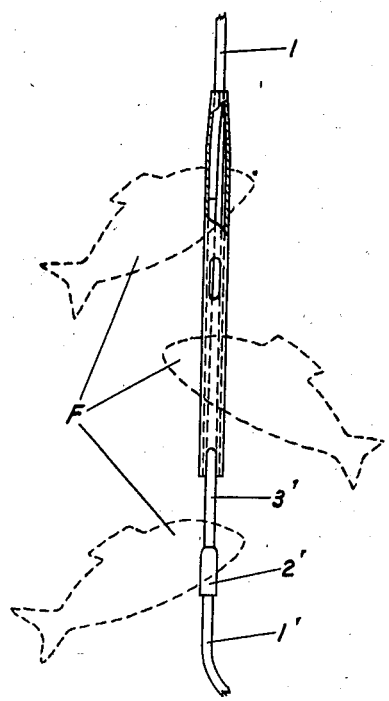

Figure 3 is an elevation view of the cord and bar portion of the fish stringer illustrated in Figure 1 in a position to discharge fish off of the bar end of the stringer, and Figure 4 is a broken elevation view of the cord and bar portion of the fish stringer illustrated in Figure 1 with the bar portion shown fitted over the needle portion of another stringer to permit the transfer of fish from one stringer onto another stringer.

Numeral 1 designates the flexible cord portion of my stringer on one end of which a ferrule 2 is clamped and into which ferrule the needle 3 of the stringer is mounted. The construction of the cord 1, the ferrule 2, and the needle 3 of my stringer follows the prior art teaching in fish stringers. My inventive contribution to the art of fish stringers lies in my novel construction of my stop bar 4 which is mounted on the lower end of the cord 1.

While the drawing shows my stop bar 4 as being formed out of a section of a tube, it is to be understood that my stop bar 4 may be made out of a flat piece of metal or out of curved shaped strips of metal or other materials within the scope of my invention.

In joining my cord 1 to my stop bar 4 I embed a substantial portion of my cord 1 in the end of the stop bar 4 and finish the joint off smooth so that strung fish may slide easily from my cord 1 onto my stop bar 4. Through a medial portion of the tubular stop bar 4 I provide a slot 6 of sufficient length and width to permit a portion of the cord 1 to be doubled and shoved through the slot 6, as in Figures 1 and 2 of my drawing. I provide a notch 7 in the other end of my tubular stop bar 4 large enough for the cord 1 to lie in. The notch 7 should preferably be made small enough to necessitate the cord 1 being wedged into place so as to assist in preventing the stop bar 4 from becoming accidentally disengaged from its set position as shown in Figure 1, the position the stop bar 4 stays in while the fish stringer is in active use. In this set position my tubular stop bar 4 performs the same function as do the stop bars of prior art fish stringers. My invention in a fish stringer due to the construction of my stop bar 4 makes it possible to unstring a string of fish without having to remove them one by one from off the needle portion of the stringer. My stop bar 4 is so arranged on my cord 1 that in the unset position of my stop bar 4 as shown in Figures 3 and 4 of my drawing the stop bar 4 becomes aligned with the cord 1 of my stringer to permit the fish F to be slid off of the stop bar 4 into a receptacle such as the tub T shown in Figure 3. If desired, the stop bar 4 after being unset may be placed over the needle 3' of another stringer so that the fish from my stringer may be slid off of the stop bar 4 of my stringer over the needle 3' and ferrule 2' and onto the cord 1' of the other stringer. Such a transfer of fish from one stringer to another stringer prevents a second handling of the fish which makes them live longer. It is often desirable to transfer fish from one stringer to another; for example, where two men in separate boats have been fishing together and one decides to go into camp earlier than the other the remaining fisherman, when using my stringer, may slide all or part of his catch onto the stringer of the other fisherman without removing either string of fish out of the water.

To put the stop bar 4 in its set position as shown in Figure 1, the cord 1 is doubled, pushed through the slot 6 and looped over the end of the stop bar 4 into the notch 7 after all of the slack has been pulled out of the cord 1. The dotted line representation of the cord 1 in Figure 1 shows the first step in loosening the stop bar 4. The cord 1 need be pulled through the slot 6 only a slight amount to permit it to be looped out of the notch 7.

Figure 2:
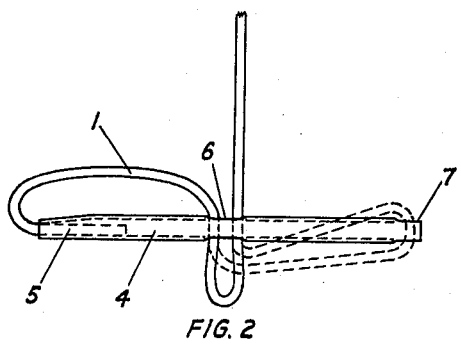
Figure 2 is a plan view of the cord and bar portion of the fish stringer illustrated in Figure 1 showing the first step in unsetting the stop bar.

Figure 2 illustrates more clearly the step of unloosening the cord 1 from the notch 7, the first step in disassembling the stop bar 4 from its set position. When the cord 1 is entirely drawn through the slot 6 the stop bar 4 assumes the unset position in which position the fish F may be readily slid off, as see Figure 3 and Figure 4.

Neither the slot 6 nor the notch 7 is absolutely essential to the operation of my novel fish stringer, for a half hitch knot of the cord 1 might be made about a medial portion of my stop bar 4 to bring it into a set position. Where only the slot 6 is provided the cord 1 could be looped over the end of the stop bar 4 and drawn up around a medial portion of the stop bar 4. The disadvantages of such an incomplete structure come about when the stringer is loaded with fish, for it is very difficult to slip the cord 1 back the considerable distance necessary to unset the stop bar. In my preferred construction above described it is only necessary to slide the cord 1 a fraction of an inch, so little that the cord 1 may be picked out of the notch 7 with the needle 3.

The cord 1 of my stringer may be made out of cotton, flax, or other flexible materials. The ferrule 2 may be made out of any metal but preferably brass. The needle 3 should preferably be made out of hard steel, but it may be made out of other materials. The stop bar 4 may be made out of metals or other suitable materials. I contemplate also making the needle 3 and stop bar 4 out of plastic materials. When plastic materials are used, the needle 3 and the stop bar 4 would be moulded directly onto the cord 1.

Having thus described my invention, I claim:

1. A fish stringer comprising a cord, a needle mounted on one end of the cord, the other end of the said cord being fastened to one end of a stop bar and in alignment with the stop bar, said stop bar being provided with a slot through a medial portion of its length of sufficient size to receive a doubled portion of the said cord and being provided with a notch into which the cord may be looped.

2. A fish string comprising a cord, a needle mounted on one end of the cord, the other end of said cord being fastened to one end of a tubular stop bar with the cord extending out of said end of the tubular stop bar, the bore of said stop bar being large enough to receive the needle portion of another stringer to permit fish from one stringer to be slid directly onto the other stringer, said tubular stop bar being provided with a slot through a medial portion of its length of a sufficient size to receive a doubled portion of the said cord, said tubular stop bar being provided with a notch into which the said cord may be looped.

ALGERNON F. FLOURNOY.